United States Patent [19]

Åkerström et al.

[11] 4,319,837
[45] Mar. 16, 1982

[54] DEVICE FOR CONTROLLING THE CORRECT POSITIONING OF A FILM CASSETTE IN A CASSETTE HOLDER

[75] Inventors: Bengt Åkerström, Lidingö; Per Molinder, Rönninge, both of Sweden

[73] Assignee: Hugin Kassaregister AB, Stockholm, Sweden

[21] Appl. No.: 19,337

[22] Filed: Mar. 12, 1979

[30] Foreign Application Priority Data

Mar. 15, 1978 [SE] Sweden ............... 7802988

[51] Int. Cl.³ ................................. G03B 27/60
[52] U.S. Cl. ............................. 355/73; 352/222
[58] Field of Search ............. 355/50, 51, 64, 65, 355/73; 352/222

[56] References Cited

U.S. PATENT DOCUMENTS 3,645,619  2/1972  Burton et al. ............ 355/50 X
3,861,799  1/1975  Chiswell et al. ............ 355/64
3,936,185  2/1976  Gross ........................ 355/73
4,148,579  4/1979  Axelrod et al. ............ 355/64 X Primary Examiner—Richard A. Wintercorn
Attorney, Agent, or Firm—Darby & Darby

[57] ABSTRACT

A system for assuring the correct positioning of a film cassette in a cassette holder in a device in which documents are withdrawn from a holder and transported to a position where they are photographed utilizing the film in the cassette, in which at least one suction cup is attached to the cassette holder with the cup having an opening lying in a plane corresponding to the correct position of the cassette in the holder and the suction cup is connected to a vacuum system and a pressure-sensitive device which is responsive to the correct or incorrect position of the cassette in the holder to operate or disable the document withdrawal mechanism or its drive source.

7 Claims, 2 Drawing Figures

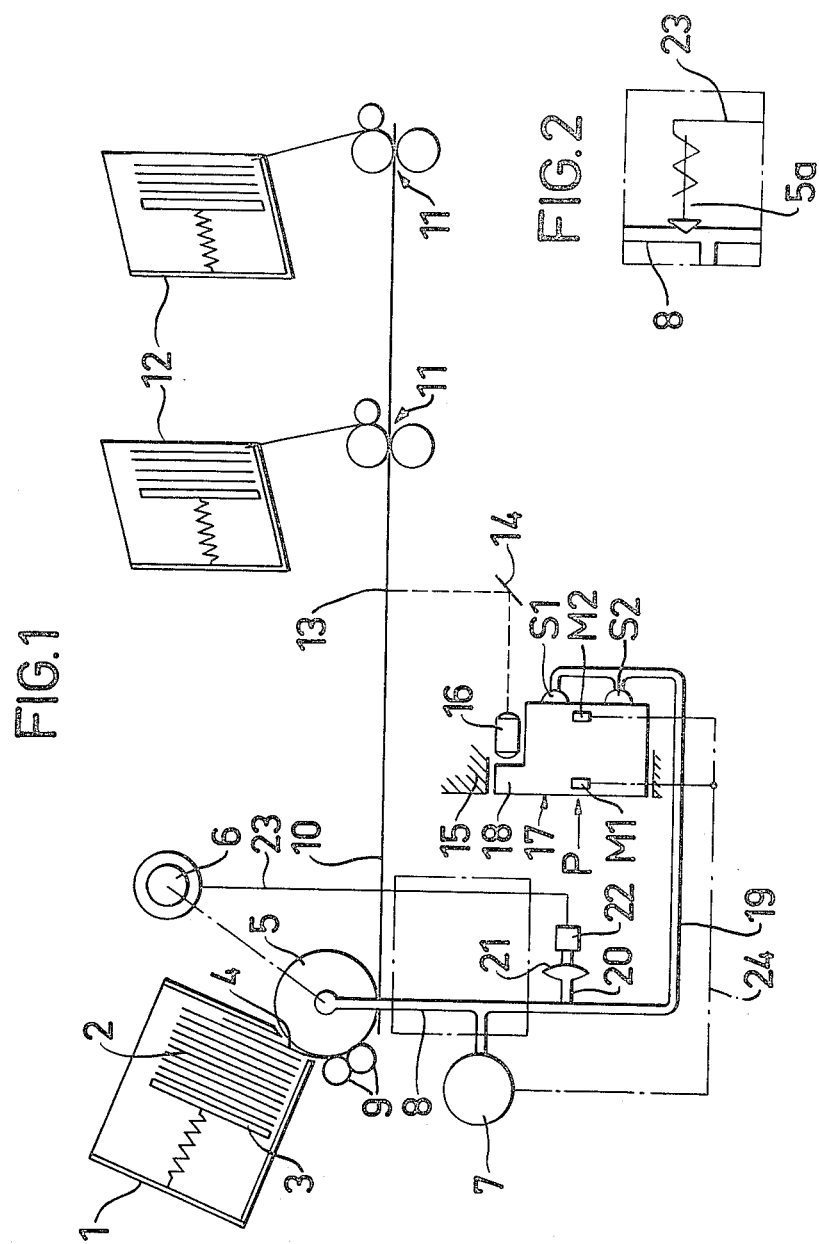

DEVICE FOR CONTROLLING THE CORRECT POSITIONING OF A FILM CASSETTE IN A CASSETTE HOLDER

This invention relates to a device for controlling the correct positioning of a film cassette in a cassette holder provided with guide means in vertical and lateral directions, when photographing a series of documents withdrawn from a storage box which are to be fed to processing and storage places.

In spite of the fact that the substantially parallelepiped cassette at its insertion into the correspondingly shaped cassette holder is guided in both vertical and lateral directions by longitudinal guide bars provided on the inner surface of the holder, it is not fully ensured that the cassette will be positioned accurately with respect to the photographic optics, which has limited mobility relative to the holder. The result of the photographing, as a matter of fact, will be spoiled, above all by blur, when the cassette is not inserted completely, which implies that the rear surface of the cassette does not sealingly contact the stop surface of the cassette holder, which can be the case also when the cassette is pushed in forcibly and rebounds.

These consequences, resulting from uncautious insertion of the cassette and vibrations in the installation, and disturbing the photographing, are safely prevented by the device according to the present invention, in that at least one suction cup is attached on the rear part of the holder and lies with its opening in the plane of the correct position of the rear cassette surface, and via conduits is connected to a vacuum source, which acts on a pressure-sensitive member in the conduit system, in such a manner, that first upon sealing contact between the suction cup and the rear surface of the cassette said vacuum source delivers sufficient vacuum for causing the pressure-sensitive member to actuate a control means for the form withdrawal mechanism or the drive source thereof.

An additional safeguard against possible inclination of the cassette in its plane, due to jamming or other reasons, is obtained by attaching two suction cups in spaced relationship along the stop surface of the cassette holder.

The invention is especially advantageous when it is applied to conventional installations, where the forms to be photographed are withdrawn from a box by means of a perforated suction roll, because then the vacuum source thereof can be utilized for the suction cup or cups.

The invention applied in the aforesaid way is described in greater detail in the following, with reference to the accompanying drawing, in which FIG. 1 is a schematic view of an installation, which is provided with a device according to the invention and intended for photographic recording and sorting of forms with respect to their data, for example, pools coupons, and FIG. 2 shows an alternative section from FIG. 1 for control of the form feed.

An inclined storage box 1 holds a bundle of forms 2, which are held in abutment to the front surface of the box by a spring-actuated thrust plate 3. In the lower portion of the box a slot 4 is located, in which a perforated suction roll 5 engages which is driven by an electric motor 6 and receives its vacuum from a vacuum source, which in the embodiment shown is a pump means 7, via a conduit 8. Guided by counter-rolls 9 one form after the other is pulled down in conventional manner by the roll 5 and discharged thereafter onto a connected conveying belt 10. A reading unit (not shown) actuates in known manner roller systems 11 located along the belt 10 in agreement with data read from the form for deflecting the form in question to the corresponding collecting box 12, which has a design similar to that of the storage box 1.

At a transparent place 13 in the belt every passing, downward facing form is photographed via a mirror 14 located beneath the belt and optics 16 mounted in a cassette holder 15 (indicated only by obliquely dashed entrance edges). The rays from the optics pass through a window in the angular portion 18 of the cassette designated generally by 17, which portion 18 is inserted in the direction of the arrow P into the holder 15. Said portion 18 contains in the usual manner, and therefore not shown, a film loop moving past the window. The film is advanced periodically from a supply wheel to a takeup wheel, the drive axles of which project outward and engage with respective drive means in the cassette holder 15 when the cassette is entirely inserted. The drive axles are flexible in axial direction and in pushed-in state flush with the side surface of the cassette 17 inserted into the holder 15.

The arrangement described so far is known in principle and intended only to serve as an example elucidating the application of the invention.

In the embodiment shown, two suction cups S1 and S2 are attached, in a manner not described in detail, in spaced relationship along the rear narrow or stop surface of the holder. The respective cup openings are located in the plane, which is defined by the rear surface of the cassette 17 when the cassette is inserted fully and correctly.

A conduit 19 common for the suction cups extends from the cups to the vacuum pump 7, which also communicates with the conduit 8. On the way to said pump, a conduit 20 branches off from the conduit 19 and terminates in a pressure actuated switch including a prestressed membrane 21 for actuating a switch 22, which via an electric line 23 controls the switching on and off of the electric motor 6 for drive roller 5 when the membrane 21 bulges inward and, respectively, outward.

As long as there is no sealing contact between the rear surface of the cassette and the suction cups S1 and S2, i.e. as long as the cassette is not inserted fully and correctly, a leakage arises which reduces the vacuum in the conduit 19 (and 8) so that this vacuum is not capable to overcome the outward prestressed bulge of the membrane 21. This results in that the electric motor remains switched off, and no form feed takes place. When the cassette has been caused to assume its correct position entirely inserted, at which time the openings of the two suction cups are sealingly blocked, a vacuum in the conduit 19 is produced which is sufficiently high to effect the membrane 21 to bulge inward and thereby to change the position of the switch 22 so as to cause the motor 6 to start the form feed. Photographing takes place with the cassette fixed in correct position. It should be mentioned in this connection, that the cassette already prior to its contact with the suction cups has been sucked by the cups into correct position, thereby aiding in cassette insertion and reducing the influence of the human factor.

At a further development of the invention, also the coupling and operation of the drive axles of the film wheels are controlled by the insertion of the cassette.

For this purpose two microswitches M1 and M2 are attached, one after the other in the direction of movement of the cassette, on an inner surface of the cassette holder. On the corresponding surface of the cassette a stop member (concealed by microswitch M1) is provided to act in turn on the switches M1 and M2 when the cassette is being inserted. Upon actuation of the switch M1 an electromagnet (not shown) is energized to move aside (retract) the drive axles of the film spools, so that the cassette can be moved farther into the holder 15, at the same time as the pump 7 is connected via a dash-dotted conduit 24. When thereafter the second switch M2 is actuated by the stop member of the cassette, the electromagnet is deenergized so that the drive axles are moved out to operative position, i.e. into engagement with the drive means of the cassette holder, while the pump 7 is maintained connected, provided however that the cassette has assumed its correct final position by the afore-described control arrangement.

When the vacuum is high, the removal of the cassette can be facilitated by providing a manually operated leakage valve (not shown) in the conduit 19 from the suction cup, which valve is so connected to a subsequent shut-off valve provided after the membrane and before the branching-off to the pump and suction roll, that upon opening of the leakage valve the shut-off valve is closed so as not to interfere with the vacuum pressure.

As as alternative to the control (i.e. starting stopping) of the electric motor 6 by the switch 22, the switch instead can be arranged so as to act on the suction roll, for example so that the switch controls a magnetically actuated leakage valve 5a located in the conduit 8, as shown in FIG. 2, whereby when valve 5a is opened the vacuum of the suction roll is reduced so much, that the roll is not capable by suction to attract the form and to draw it out from the box 1.

The invention is not restricted to the embodiment described above, but different modifications and other applications than those shown can be imagined. In many cases for example, only a single strategically positioned suction cup can be sufficient, and it also is possible to arrange more than two suction cups. The membrane shown can be replaced by another pressure-sensitive member, such as a bellows, a piston-cylinder device etc. The illustrated components in general can be replaced by other means with substantially equivalent function.

What we claim is:

1. A device for assuring the correct positioning of a film cassette in a cassette holder provided with cassette guide means for photographing a series of documents withdrawn from a storage box by means of a withdrawal mechanism including a drive source and to be transported to processing and storage places, comprising: at least one suction cup attached on a part of the holder with an opening in a plane corresponding to the correct position of a predetermined surface of the cassette in the holder; a vacuum source; conduit means connecting said suction cup opening to said vacuum source; means for controlling the operation of said withdrawal mechanism; pressure-sensitive means connected to said conduit means and responsive to the vacuum system produced by sealing contact between the suction cup and said predetermined surface of the cassette when the cassette is in the correct position in the holder for said vacuum source to deliver sufficient vacuum for causing the pressure-sensitive means to actuate said control means for operating the document withdrawal mechanism or the drive source thereof.

2. A device as defined in claim 1, comprising two said suction cups located in spaced relationship to one another in the vertical direction on the cassette holder and each having an opening in said place and communicating with said conduit means.

3. A device as defined in claim 2, wherein the withdrawal mechanism comprises a perforated suction roll which is rotated by said drive source and a further conduit connected between the suction roll and said conduit means.

4. A device as defined in either of claims 1 or 3, wherein said pressure-sensitive means includes a movable membrane, the control means is a switch coupled to the membrane, and the drive source is an electric motor controlled by the switch.

5. A device as defined in claim 3, wherein the pressure-sensitive member is a movable membrane, and the control means is a switch for controlling an electrically operated leakage valve located in said further conduit of the suction roll.

6. A device as defined in either claims 1 or 5, further comprising drive axles for the supply and take up wheels for the cassette, two microswitches attached on a side of the cassette holder and offset relative to each other, which microswitches are positioned so that upon insertion of the cassette they are actuated in turn by a stop member located correspondingly on a surface of the cassette; means responsive to the switch actuated first for moving aside drive axles for the supply and take-up wheels of the cassette via an electromagnet and operating the vacuum source; and means responsive to said later actuated switch for returning said drive axles to an operative position and maintaining the operation of the vacuum source.

7. A device as in claim 1 wherein improper placement of the cassette in the holder decreases the vacuum delivered by the vacuum source to cause said pressure-sensitive means to operate said control means to disable the document withdrawal mechanism or the drive source therefor.

* * * * *